May 8, 1923.

Z. P. LOYD

SHOCK ABSORBER

Filed May 12, 1920

INVENTOR.
Zelmere P. Loyd.
BY Chas. E. Townsend
ATTORNEY.

May 8, 1923.

Z. P. LOYD 1,454,392

SHOCK ABSORBER

Filed May 12, 1920

INVENTOR.
Zelmere P. Loyd.
BY Chas. E. Townsend
ATTORNEY.

Patented May 8, 1923.

1,454,392

UNITED STATES PATENT OFFICE.

ZELMERE P. LOYD, OF COALINGA, CALIFORNIA, ASSIGNOR TO LOYD MANUFACTURING CO., OF OAKLAND, CALIFORNIA, A CORPORATION OF CALIFORNIA.

SHOCK ABSORBER.

Application filed May 12, 1920. Serial No. 380,758.

*To all whom it may concern:*

Be it known that I, ZELMERE P. LOYD, a citizen of the United States, residing at Coalinga, in the county of Fresno and State of California, have invented a new and useful Improvement in Shock Absorbers, of which the following is a specification.

This invention relates to a shock absorber and especially to improvements on the structure shown in my co-pending application entitled "Shock absorber," filed January 14, 1920, Serial No. 351,328.

One of the objects of the present invention is to provide a simple, substantial, cheaply manufactured shock and rebound absorber for motor vehicles and the like whereby sudden shocks and vibrations, caused by obstructions or undulations in a road surface, may be largely absorbed, and especially to provide a shock absorber which is adapted to co-operate with the ordinary semi-elliptical springs with which most standard vehicles are equipped.

Another object of the present invention is to provide a shock absorber in which all shocks, vibrations and rebounds are absorbed by pneumatic and spring action; further to provide a rigid housing or cylinder in which the springs and entire mechanism is inclosed and protected from dust, grit and moisture.

Another object of the invention is to construct a shock absorber which is so arranged that all parts may be readily lubricated; further to provide means for automatically maintaining the lubricant in constant circulation.

Another object of the invention is to provide a shock absorber which substantially prevents all lateral movement or side sway, and which may be installed on practically any car without cutting the frame or changing the spring connections in any manner.

Another object of the invention is to provide improved means for rigidly connecting a pair of shock absorbers, whether they be placed in the front or rear of the car, thus further securing and bracing the shock absorbers with relation to the springs and frame of the car.

Another object of the invention is to provide a shock absorber in which the main movable part consists of a piston, said piston being connected with a spring, and also to provide means for locking the piston against turning movement.

Further objects will hereinafter appear.

The invention consists of the parts and the construction, combination and arrangement of parts as hereinafter more fully described and claimed, having reference to the accompanying drawings, in which—

Figure 1:
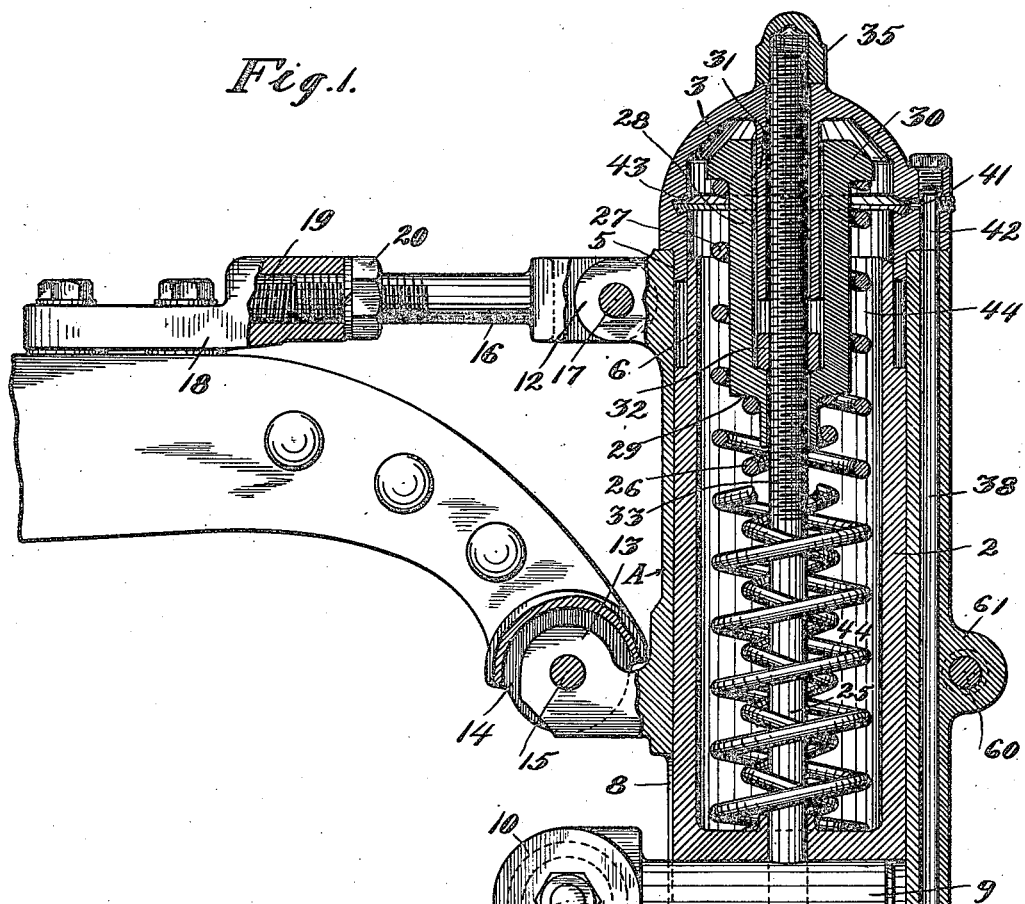
Fig. 1 is a central vertical longitudinal section through one of the shock absorbers, showing it attached to the frame and spring of a vehicle.

Referring to the drawings in detail, A indicates a cylinder, interior of which is mounted a piston 2. The upper and lower ends of the cylinder are closed by head members 3 and 4, which are secured thereto in any suitable manner. Each head member is provided with an annular extension, as at 5, which is adapted to enter the respective ends of the cylinder, and the opposite ends of the piston are reduced in diameter, as at 6 and 7, to form dash-pots, as will hereinafter be described.

Formed in one side of the cylinder is a slot 8, and extending therethrough is a wrist pin 9, which is suitably secured in the piston 2. The wrist pin extends through the slot 8, and formed on its outer end is a lug 10, to which the semi-elliptical spring of a vehicle is pivotally attached as at 11. The cylinder proper is attached to the frame at two points, this being accomplished by forming a pair of lugs 12 and 13. The lug 13 passes upwardly between a pair of lugs 14, formed on the forward end of the frame, and is secured therein by means of a pin or bolt 15. The lug 12 is tied to the upper part of the frame by means of a bolt 16, which is attached at one end to the lug 12, as shown at 17, and at the opposite end to a bracket 18 secured to the frame. This bracket is provided with an internally threaded boss 19 and the rod 16 is also threaded to permit insertion thereof; the bolt being secured when inserted by a lock nut 20.

Extending through the head members 3 and 4 and the piston 2, is a rod 25, and surrounding said rod is a pair of springs 26 and 27. These springs are mounted one interior of the other and are interposed between the piston proper and a shouldered sleeve 28, the spring 26 engaging an annular shoulder 29 formed on the lower end of the sleeve, and the spring 27 an annular shoulder 30 formed at the upper end of the sleeve. The sleeve is slidably mounted on a central inwardly extending boss 31 formed on the upper head member 3, and it is adjustable with relation to the rod 25 by means of a nut 32. The rod is threaded as at 33 to receive the nut and it is freely turnable with relation to the respective head members and the piston. A head is formed on the lower end of the rod, as at 34, to transmit a turning movement thereto, and a lock nut 35 is mounted on the upper end of the rod to secure it against turning movement when adjustment has been secured. The boss 31, formed on the upper head member, is hexagonal in shape and similarly the interior portion of the sleeve. The sleeve and the nut is in this manner secured against turning movement and will therefore travel longitudinally of the head 3 and the rod 25 when this is turned. In other words the rod serves the function of increasing or decreasing the tension of the respective springs 26 and 27; this being accomplished by loosening the lock nut 35 and turning the rod 25 in one direction or another by means of a wrench or the like applied to the head 34.

For the purpose of efficiently lubricating the piston and the interior parts of the cylinder, an automatic oil circulating system has been provided. This is produced by forming a longitudinally extending rib on the forward side of the cylinder and coring an oil duct 38 therein. This duct communicates with passages 39 and 40, formed in the lower head member, and similarly with passages 41 and 42, formed in the upper head member. The passage 41 communicates with an annular groove or recess 43, formed in the upper head member, and consequently with an upper chamber 44 formed between the piston and the head 3. The passage 40 communicates with a lower chamber 45, formed between the piston and the lower head member, and as a check valve 46 is mounted in the passage 39, it can readily be seen that oil circulation will constantly be maintained through the duct 38 when the device is in operation, that is movement of a vehicle over an uneven road surface will cause a more or less constant reciprocal movement to be transmitted to the piston. Oil delivered to the upper chamber 44 through the duct 38 will gradually leak downwardly between the piston and the cylinder and will tend to accumulate in the lower chamber 45. A very limited amount can however only accumulate here as downward movement of the piston causes this to serve as a plunger, thereby forcing the oil out through the passage 40 and upwardly through the duct 38, thus returning the oil to the upper annular groove 43 which evenly distributes and delivers the oil to the upper end of the piston and the chamber 44. A certain amount of oil will also leak down between the rod 25 and the piston so constant circulation is always insured.

Figure 2:
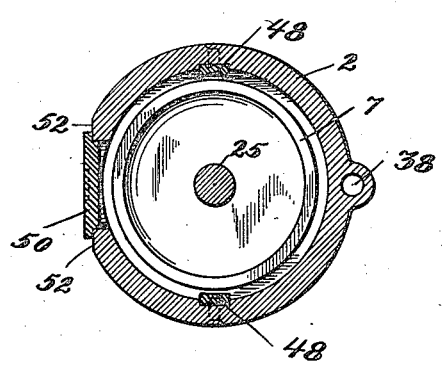
Fig. 2 is a cross section of the cylinder.
Figure 4:
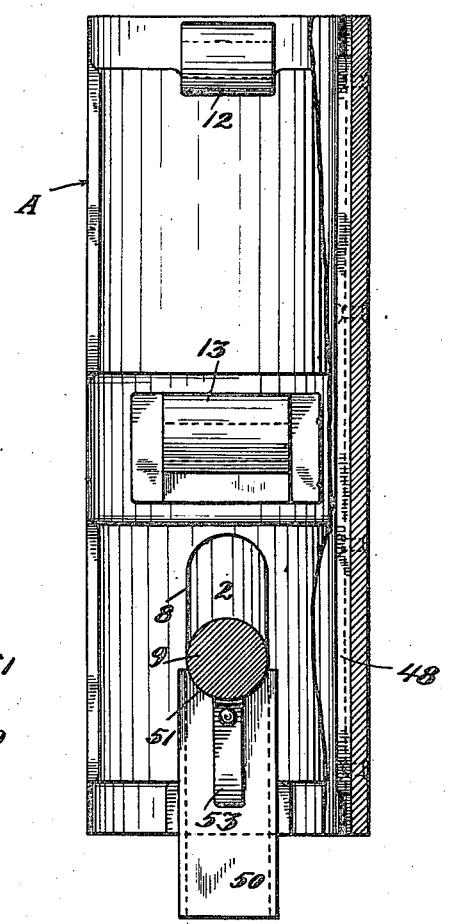
Fig. 4 is a detail cross section of the cylinder taken at right angles to Fig. 1.
Figure 3:
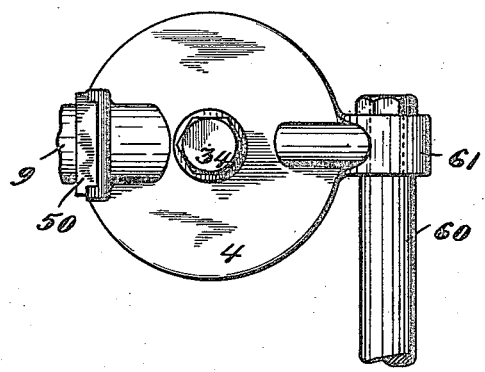
Fig. 3 is a bottom view of the same.

By referring to Figs. 2 and 4, it will be seen that means are provided for securing the piston against turning movement with relation to the cylinder. This is accomplished by forming a pair of key seats in opposite sides of the cylinder and correspondingly in opposite sides of the piston. A pair of keys are inserted in these seats as at 48 and may be secured either to the piston or the cylinder, but preferably to the cylinder as here shown. The key members 48 only reach as far as the extensions 5 on the respective head members. It is therefore unnecessary to recess these to accommodate the key members. The piston is of course also secured against turning movement by the wrist pin which extends through the slot 8, but it is desirable to protect the wrist pin against excess wear and strain, hence the provision of the key members 48.

For the purpose of excluding dust, grit and moisture, as much as possible, I provide a sliding cover plate 50. This plate partly embraces the wrist pin 9, as at 51, and it engages a seat 52, formed on each side of the slot 8, it being held in frictional engagement with said seat by means of a spring 53. One end of the spring is secured to the plate 50 by means of a rivet 54, while the opposite end of the spring engages a notch 55, formed in a downwardly extending projection 56, forming part of the lug 10. In other words a positive connection is not made between the cover plate and the wrist pin, but nevertheless a unitary movement is obtained due to the spring connection provided; similarly a dust-proof joint is maintained due to the constant tension of the spring. The cover plate closes the lower end of the slot 8 and the piston proper the upper end. The only part of the piston that can possibly be exposed to dust is that part just above the wrist pin which covers the upper portion of the slot.

From the foregoing description it can be seen that several improvements have been made when comparing the present device with the structure shown in my co-pending application; first of all both spring and pneumatic action is permitted; second an automatic lubricating system is provided whereby the oil is maintained in constant circulation; third, means are provided for positively securing the piston against turning movement with relation to the cylinder, thereby relieving the wrist pin of excess wear and strain; fourth, an improved mechanism for increasing or decreasing the tension of the springs 26 and 27 has been provided; and fifth a more rigid and substantial connection has been provided for securing the cylinder to the frame. The general construction has also been simplified and the cost of manufacture and maintenance is therefore reduced to a minimum.

In actual operation it can be seen that reciprocal movement will be transmitted to the piston, due to the fact that it is attached to the spring. The piston will therefore slide with relation to the central rod 25 and the main cylinder and will, due to this movement, alternately cause compression and extension of the springs 26 and 27. In fact these springs are employed for supporting the normal load and for absorbing the minor shocks and vibrations produced when the vehicle is travelling over a road surface; excess shocks and rebounds being taken care of by either end of the piston when air is compressed or vacuum is produced in the annular chambers formed between the reduced portions of the piston, as at 6 and 7, and the annular head extensions 5. This is of great importance as it relieves the springs of excess loads and positively prevents hammering or striking of the piston at either end of its stroke. The dash-pot effect produced is of further importance as it materially assists in moving or transferring the oil from one end of the cylinder to the other, that is, oil trapped in the upper annular dash-pot chamber is forced downwardly between the piston and cylinder, and also between the keys and the key-way slots, thus producing what may be termed forced lubrication; all oil collecting in the lower chamber being of course automatically returned through the vertical duct 38 and evenly distributed in the upper end of the cylinder, due to the provision of the annular groove 43.

The cylinders are, as previously described, fastened to the frame at two points, as at 12 and 13, and to the springs by means of the lugs 10. They are otherwise connected by a cross rod 60, passing through the lugs 61 formed on the respective cylinders; this being true both of the front and rear set of cylinders. A substantial tie is in this manner made or formed which rigidly connects and braces the cylinders against lateral displacement.

While certain features of the present invention are more or less specifically illustrated, I wish it understood that modification and changes in construction may be resorted to within the scope of the appended claims, similarly that the materials and finish of the several parts employed may be such as the experience and judgment of the manufacturer may dictate or varying conditions may demand.

Having thus described my invention, what I claim and desire to secure by Letters Patent is—

1. A shock absorber comprising a cylinder, a piston reciprocally mounted therein, a spring interposed between one end of the cylinder and the piston adapted to absorb a normal load, pneumatic cushioning means for each end of the piston adapted to absorb maximum loads, a rod disposed in the cylinder independent of the piston, and means actuated by turning movement of said rod for increasing or decreasing the tension of the spring.

2. A shock absorber comprising a cylinder, a piston reciprocally mounted therein, springs interposed between the cylinder and piston adapted to absorb a normal load, a dash pot chamber formed between each end of the piston and cylinder adapted to absorb maximum loads, a head member on each end of the cylinder, a rod extending through the cylinders and said head members and centrally disposed with relation to the same, a thread formed on one end of the rod, a nut on said threaded portion, a sleeve slidably mounted on the rod, means for locking the sleeve against turning movement, means on the sleeve for locking the nut against turning movement, and means on the sleeve engaging the springs.

3. In a device of the character described a cylinder, a piston reciprocally mounted therein, a head member on each end of the cylinder, a rod extending through the head members and cylinder and centrally positioned with relation thereto, means permitting turning movement of the rod, means for locking the rod against turning movement, a sleeve slidably mounted on the rod, means for securing the sleeve against turning movement, a threaded portion on the rod, a nut engaging said threaded portion, means on the sleeve for locking the nut against turning movement, and a spring interposed between the sleeve and the piston.

4. In a device of the character described a cylinder, a piston reciprocally mounted therein, a head member on each end of the cylinder, a threaded rod extending through the cylinder and the head members, a boss on one of the head members, through which the rod extends, a sleeve surrounding said boss and the rod and slidably mounted with relation to the same, means for locking the sleeve against turning movement with relation to the boss, a nut upon the rod within the sleeve and interposed between the boss and the sleeve, means on the sleeve for locking said nut against turning movement, and a spring interposed between the sleeve and the piston.

5. In a device of the character described a cylinder, a piston reciprocally mounted therein, a head member on each end of the cylinder, a reduced extension on each end of the piston adapted to enter the respective head members and adapted to form an annular compression chamber between each end of the piston and each head member.

6. In a device of the character described a cylinder, a piston reciprocally mounted therein, a head member on each end of the cylinder a reduced extension on each end of the piston adapted to enter the respective head members and adapted to form an annular compression chamber between each end of the piston and each head member, and a spring interposed between one end of the cylinder and one of the head members.

7. In a device of the character described a cylinder, a piston reciprocally mounted therein, a head member on each end of the cylinder, a reduced extension on each end of the piston adapted to enter the respective head members and adapted to form an annular compression chamber between each end of the piston and each head member, a spring interposed between one end of the cylinder and one of the head members, and means actuated from the exterior of the cylinder for increasing or decreasing the tension of the spring.

8. In a device of the character described a cylinder, a piston reciprocally mounted therein, a head member on each end of the cylinder, cushioning means formed between the head members and the opposite ends of the piston, a wrist pin on the piston, a slot on one side of the cylinder through which said wrist pin projects, and means in the cylinder for locking the piston against turning movement with relation to the cylinder.

9. In a device of the character described a cylinder, a piston reciprocally mounted therein, a head member on each end of the cylinder, cushioning means formed between the head members and the opposite ends of the piston, a wrist pin on the piston, a slot on one side of the cylinder through which said wrist pin projects, a key-way formed in opposite sides of the piston and cylinder, and a pair of key members cooperating therewith to secure the piston against turning movement with relation to the cylinder.

10. In a device of the character described a cylinder, a piston reciprocally mounted therein, a head member on each end of the cylinder, cushioning means formed between the head members and the opposite ends of the piston, a wrist pin on the piston, a slot on one side of the cylinder through which said wrist pin projects, means in the cylinder for locking the piston against turning movement with relation to the cylinder, a pair of seat members, one on each side of the slot, a cover plate therefor, movable in unison with the piston, and spring actuated means holding the cover plate in engagement with the seat members.

11. In a device of the character described a cylinder having a slot formed therein, a piston reciprocally mounted in the cylinder, a wrist pin on the cylinder projecting through the slot, a seat formed on each side of the slot, and a cover plate therefor, movable in unison with the piston and wrist pin.

12. In a device of the character described a cylinder having a slot formed therein, a piston reciprocally mounted in the cylinder, a wrist pin on the cylinder projecting through the slot, a seat formed on each side of the slot, a cover plate therefor, movable in unison with the piston and wrist pin, and spring actuated means for maintaining the cover plate in engagement with the respective seats.

13. In a device of the character described a cylinder having a slot formed therein, a piston reciprocally mounted in the cylinder, a wrist pin on the cylinder projecting through the slot, a seat formed on each side of the slot, a cover plate for said slot engageable with the seat members, a downwardly projecting lug on the wrist pin, and a spring interposed between the lug and the plate, said spring causing unitary movement of the plate in conjunction with the piston and wrist pin, and also maintaining the cover plate in engagement with the seat members.

14. In a device of the character described, the combination with a cylinder having a slot formed in one side, of a piston reciprocally mounted in the cylinder, a projection on the piston extending through the slot, and guiding means securing the piston against turning movement with relation to the cylinder and preventing wear between the piston projection and the side walls of the slot.

15. In a device of the character described the combination with the cylinder and the piston, of a slot formed in the cylinder, a wrist pin on the piston projecting therethrough, and means independent of the slot and wrist pin for securing the piston against turning movement with relation to the cylinder, said means comprising key-way members formed between the cylinder and piston.

16. In a device of the character described the combination with the cylinder and the piston, of an oil connection formed between the respective ends of the cylinders, an annular groove formed in the upper end of the cylinder with which said oil connection communicates, and a check valve in the lower end of the oil connection to permit circulation of oil in one direction only.

17. In a device of the character described the combination with the cylinder and the piston, of a head member on each end of the cylinder, an annular groove formed in the upper head member, an oil duct in the cylinder forming a communication between said groove and the lower end of the cylinder, and a check valve in said duct to prevent flow of oil through the duct, except in an upper direction.

18. In a device of the character described the combination with the cylinder, of an upper and a lower lug formed thereon, a vehicle frame, means for forming a pivotal connection between the lower lug and the end of the frame, and means for forming an adjustable connection between the second lug and the frame.

19. In a device of the character described the combination with the vehicle frame and the cylinder, of a lug on the cylinder by which a pivotal connection may be made with the end of the frame, a second lug on the cylinder and above the first named lug, a bolt attached thereto, forming an adjustable connection between the cylinder and the frame.

20. In a device of the character described the combination with the vehicle frame and the spring therefor, of a vertically disposed cylinder, a piston within the cylinder, a pivotal connection between the forward end of the spring and the piston, and a two-point adjustable connection between the cylinder and the frame.

21. In a device of the character described the combination with the vehicle frame and the spring therefor, of a cylinder, a piston within the cylinder, a connection between the forward end of the spring and the piston, and a two-point connection between the cylinder and the frame, said two-point connection comprising an upper and a lower lug on the cylinder, a pivotal connection between the lower lug and the frame, and an adjustable connection between the upper lug and the frame.

22. In a device of the character described the combination with the main frame of a vehicle and the springs whereby the frame is supported, of a pair of cylinders, one on each side of the frame, a two-point connection between each cylinder and the frame, a piston slidably mounted in each cylinder, a slot formed in the cylinder, a wrist pin connection with each piston and projecting through the slots, a connection between each wrist pin and each spring, and a tie rod extending crosswise of the frame and connecting the cylinders.

23. In a device of the character described the combination with the vehicle frame and the cylinder, of means forming a pivotal connection between the lower end of the cylinder and the frame, a pivotal member attached to the cylinder at a point adjacent the upper end thereof, and an adjustable connection between said pivot member and the frame.

24. A shock absorber comprising a cylinder, a piston mounted therein, a spring interposed between one end of the cylinder and the piston, a rod extending longitudinally through the cylinder and piston and independent of the piston, and means actuated by turning movement of the rod for adjusting the tension of the spring.

25. In a device of the character described the combination with the vehicle frame and the spring therefor, of a cylinder, a piston reciprocally mounted in the cylinder, a pivotal connection between the spring and the piston, a pivotal connection between the frame and the lower end of the cylinder, and a second connection between the cylinder and the frame, whereby movement of the cylinder about its pivotal connection may be adjusted.

In testimony whereof I have hereunto set my hand in the presence of two subscribing witnesses.

ZELMERE P. LOYD.

Witnesses:
W. W. HEALEY,
M. E. GRING.